United States Patent
Kuhn et al.

(10) Patent No.: US 11,854,404 B2
(45) Date of Patent: *Dec. 26, 2023

(54) COMPUTING TIMING INTERVALS FOR VEHICLES THROUGH DIRECTIONAL ROUTE CORRIDOR

(71) Applicant: Uber Technologies, Inc., San Francisco, CA (US)

(72) Inventors: Kenneth Kuhn, San Francisco, CA (US); Eoin O'Mahony, San Francisco, CA (US); Miraj Ramhematpura, San Francisco, CA (US); Mustafa Sahin, San Francisco, CA (US); Lior Seeman, San Francisco, CA (US); Philippe Sekine, San Francisco, CA (US); Vishnu Srinivasan Sundaresan, San Francisco, CA (US); Meisam Vosoughpour, San Francisco, CA (US); Danhua Guo, San Francisco, CA (US); Robert Paine, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/859,223

(22) Filed: Jul. 7, 2022

(65) Prior Publication Data

US 2022/0335834 A1    Oct. 20, 2022

Related U.S. Application Data

(63) Continuation of application No. 16/535,564, filed on Aug. 8, 2019, now Pat. No. 11,482,111.

(Continued)

(51) Int. Cl.
*G08G 1/00* (2006.01)
*G06Q 50/30* (2012.01)
(Continued)

(52) U.S. Cl.
CPC .......... *G08G 1/202* (2013.01); *G06Q 30/0205* (2013.01); *G06Q 50/30* (2013.01); *G08G 1/127* (2013.01)

(58) Field of Classification Search
CPC .... G08G 1/202; G08G 1/127; G06Q 30/0205; G06Q 50/30
See application file for complete search history.

(56) References Cited

U.S. PATENT DOCUMENTS

| 4,858,120 A | 8/1989 | Samuelson |
|---|---|---|
| 10,359,783 B2 | 7/2019 | Williams |

(Continued)

FOREIGN PATENT DOCUMENTS

| CN | 202443493 | 9/2002 |
|---|---|---|
| CN | 104021668 | 9/2014 |

(Continued)

OTHER PUBLICATIONS

ISR and Written Opinion in PCT/US2018/062084 dated Feb. 22, 2019.

(Continued)

*Primary Examiner* — Gertrude Arthur Jeanglaude
(74) *Attorney, Agent, or Firm* — MAHAMEDI IP LAW LLP

(57) ABSTRACT

A system computes a timing interval between high-capacity vehicles (HCVs) for each of a plurality of HCV corridors within a geographic region, each respective HCV corridor of the plurality of HCV corridors including a start area. For each respective HCV corridor, the system transmits, via a network communication interface, (i) first data to a first computing device associated with a first HCV, the first data indicating the start area of the respective HCV corridor, and a first start time for the first HCV, and (ii) second data to a second computing device associated with a second HCV, the (Continued)

second data indicating the start area of the respective HCV corridor and a second start time for the second HCV, wherein the first start time for the first HCV and the second start time for the second HCV are based on the computed timing interval for the respective HCV corridor.

20 Claims, 8 Drawing Sheets

Related U.S. Application Data

(60) Provisional application No. 62/875,367, filed on Jul. 17, 2019.

(51) Int. Cl.
  *G06Q 30/0204* (2023.01)
  *G08G 1/127* (2006.01)

(56) References Cited

U.S. PATENT DOCUMENTS

| | | | |
|---|---|---|---|
| 10,425,490 B2 | 9/2019 | Yamashita | |
| 10,697,784 B1 | 6/2020 | Li | |
| 11,122,255 B2 | 9/2021 | Rahematoura | |
| 11,482,111 B2 * | 10/2022 | Kuhn | G06Q 30/0205 |
| 2003/0195699 A1 | 10/2003 | Jones | |
| 2006/0178812 A1 | 8/2006 | Affleck | |
| 2009/0192851 A1 | 7/2009 | Bishop | |
| 2010/0036606 A1 | 2/2010 | Jones | |
| 2010/0325719 A1* | 12/2010 | Etchegoyen | H04L 69/40 726/15 |
| 2011/0099040 A1 | 4/2011 | Felt | |
| 2012/0130627 A1 | 5/2012 | Islam | |
| 2012/0232943 A1 | 9/2012 | Myr | |
| 2013/0158846 A1 | 6/2013 | Zhang | |
| 2013/0226627 A1 | 8/2013 | Kubovcik | |
| 2014/0051465 A1 | 2/2014 | Ruys | |
| 2015/0206437 A1 | 7/2015 | Fowler | |
| 2015/0271290 A1 | 9/2015 | Tao | |
| 2015/0324708 A1 | 11/2015 | Skipp | |
| 2015/0348221 A1 | 12/2015 | Pedersen | |
| 2015/0369621 A1 | 12/2015 | Abhyanker | |
| 2016/0055605 A1 | 2/2016 | Kim | |
| 2016/0129787 A1 | 5/2016 | Netzer | |
| 2016/0209220 A1 | 7/2016 | Laetz | |
| 2016/0210691 A9 | 7/2016 | LaFrance | |
| 2016/0232719 A1 | 8/2016 | Brinig | |
| 2016/0247247 A1 | 8/2016 | Scicluna | |
| 2016/0307287 A1 | 10/2016 | Jat | |
| 2016/0307289 A1 | 10/2016 | Choksi | |
| 2016/0373473 A1 | 12/2016 | Truong | |
| 2017/0052034 A1 | 2/2017 | Magazinik | |
| 2017/0169366 A1 | 6/2017 | Klein | |
| 2017/0193458 A1 | 7/2017 | Talmon | |
| 2017/0314948 A1 | 11/2017 | Racah | |
| 2018/0025407 A1 | 1/2018 | Zhang | |
| 2018/0032964 A1 | 2/2018 | Gkiotsalitis | |
| 2018/0060988 A1 | 3/2018 | Klenk | |
| 2018/0091604 A1 | 3/2018 | Yamashita | |
| 2018/0101877 A1 | 4/2018 | Song | |
| 2018/0143027 A1 | 5/2018 | Schlesinger | |
| 2018/0281803 A1 | 10/2018 | Mukai | |
| 2018/0302743 A1 | 10/2018 | Bai | |
| 2018/0339712 A1 | 11/2018 | Kislovskiy | |
| 2019/0146508 A1 | 5/2019 | Dean | |
| 2019/0146509 A1 | 5/2019 | Dean | |
| 2019/0154454 A1 | 5/2019 | Verma | |
| 2019/0164432 A1 | 5/2019 | Quitoriano | |
| 2019/0212149 A1 | 7/2019 | Ho | |
| 2020/0042019 A1 | 2/2020 | Marczuk | |
| 2020/0168100 A1 | 5/2020 | Quitoriano | |
| 2020/0192366 A1 | 6/2020 | Levinson | |
| 2020/0292346 A1 | 9/2020 | Turner | |
| 2020/0356911 A1* | 11/2020 | Sahin | G06Q 10/047 |
| 2020/0393256 A1 | 12/2020 | Sahin | |
| 2020/0402392 A1 | 12/2020 | Robinson | |
| 2021/0020047 A1 | 1/2021 | Kuhn | |
| 2021/0108931 A1 | 4/2021 | Liu | |
| 2021/0295707 A1 | 9/2021 | Quitoriano | |
| 2022/0170753 A1 | 6/2022 | Verma | |

FOREIGN PATENT DOCUMENTS

| | | |
|---|---|---|
| CN | 104537831 | 4/2015 |
| CN | 103136933 | 7/2015 |
| CN | 10585148 | 12/2015 |
| CN | 105679076 | 6/2016 |
| CN | 106408099 | 2/2017 |
| CN | 107451690 | 12/2017 |
| CN | 109034566 | 12/2018 |
| CN | 109493588 | 3/2019 |
| EP | 3355028 | 8/2018 |
| KR | 10-2019-007627 | 7/2019 |
| WO | WO 2012/0167319 | 12/2012 |
| WO | WO 2016/0127109 | 8/2016 |
| WO | WO 2017/0132447 | 8/2017 |

OTHER PUBLICATIONS

ISR and Written Opinion in PCT/US2018/062297 dated Feb. 13, 2019.
IPRP in PCT/2018/062084 dated Jun. 4, 2020.
IPRP In PCT/2018/062297 dated Jun. 11, 2020.
ISR and Written Opinion in PCT/US2020/037604 dated Sep. 24, 2020.
ISR and Written Opinion in PCT/US2020/037562 dated Sep. 24, 2020.
Liang, Rerouting Buses using Data Science—Part 1, Open Government Products, Jan. 15, 2019, https://blog.data.gov.sg/ rerouting-buses-using-data-science-part-i-4d6c9d4f1f.
ISR and Written Opinion in PCT/US2020/032041 dated Oct. 1, 2020.
WRO in PCT/US2020/032041 dated Apr. 26, 2021.
IPRP in PCT/US2020/032041 dated Jul. 29, 2021.
Pan Juan; Proactive Vehicle re-routing strategies for congestion avoidance, 2017, NJIT.edu, https:// web.njit.edu/ borcea/ papers/ dcross 12.pdf (2017).
Luo, Shuyu: Optimization: Loss Function under the Hood (Part I), Sep. 24, 2018, Towards Data Science (2018).
Luo, Shuyu: Loss Function (Part II): Logistic Regression, Oct. 13, 2018, Medium.com (2018).
Luo, Shuyu, Loss Function (Part III) Support Vector Machine, Oct. 15, 2018, Medium.com (2018).

* cited by examiner

COMPUTING TIMING INTERVALS FOR VEHICLES THROUGH DIRECTIONAL ROUTE CORRIDOR

CROSS-REFERENCE TO RELATED APPLICATIONS

This application is a continuation of U.S. patent application Ser. No. 16/535,564, filed on Aug. 8, 2019; which claims benefit of priority to provisional U.S. patent application Ser. No. 62/875,367, filed Jul. 17, 2019; the aforementioned applications being hereby incorporated by reference in their entireties.

BACKGROUND

High capacity transit through metropolitan areas typically involves trains and/or buses traveling fixed routes with fixed pick-up and drop-off stations and on fixed schedules. On-demand services are typically implemented using servers and/or other types of network computing systems in communication with mobile devices of users and service providers. However, the fixed routes and fixed schedules of high capacity transit systems are not engineered to efficiently utilize the data available to these on-demand services and the benefits provided by mobile device technology.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
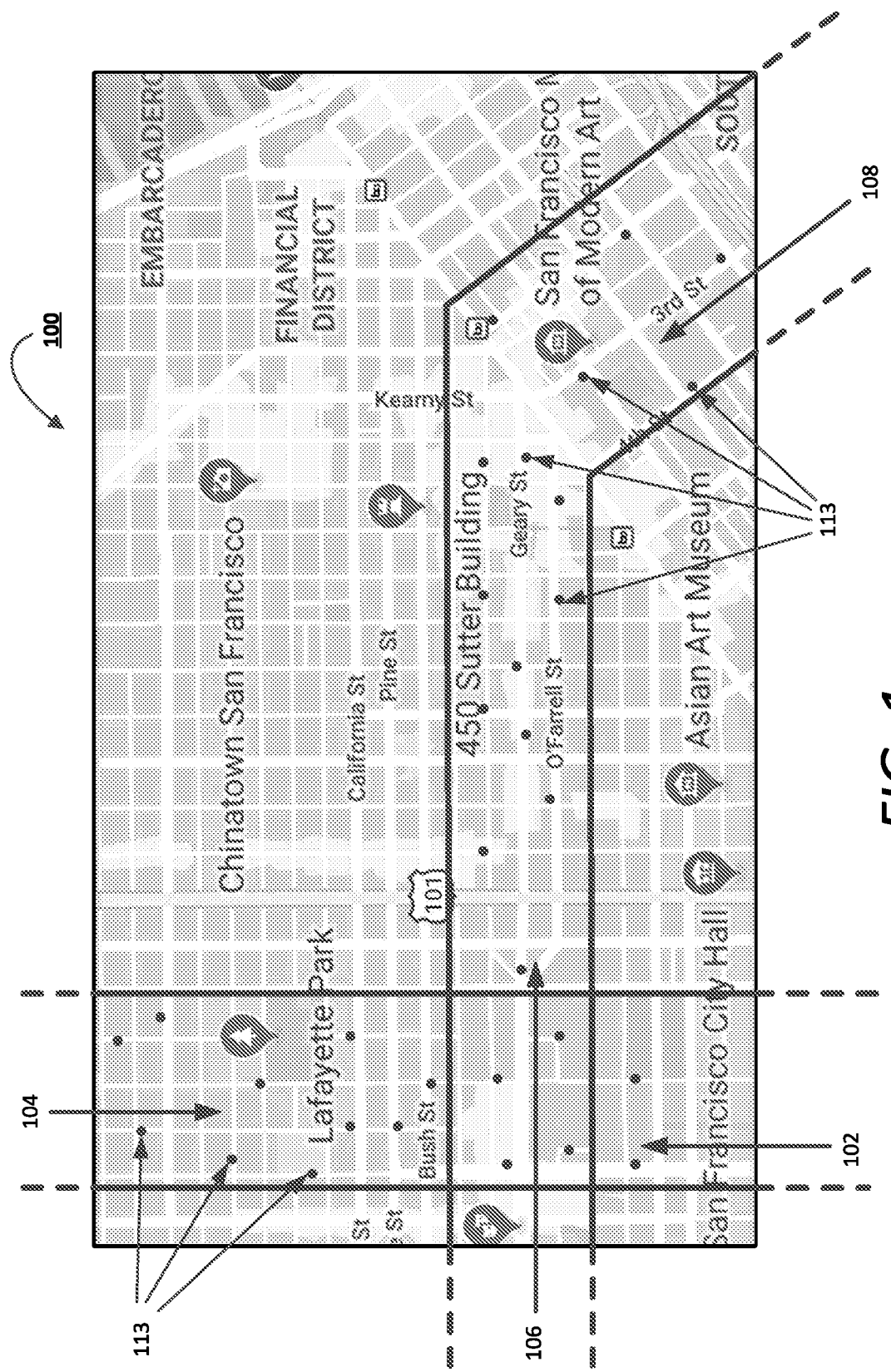
FIG. 1 illustrates a portion of a road network map including visualizations of route corridors through which high capacity vehicles (HCVs) may be dynamically routed to service transport requests, according to examples provided herein.

According to examples described herein, a road network map for a geographic region can be parsed into corridors for high capacity vehicles (HCVs) to fulfill transport demand for a significant portion of the geographic region. Each HCV corridor can include a general start location or start area and a general end location or end area and can include any number of pick-up and drop-off locations therebetween. In some examples, passengers are picked-up and dropped-off at fixed locations determined from analysis of historical transport data for the geographic region (e.g., observed historical trip origin and destination locations or clusters of such locations over a given duration of time). Numerous different routes, which comprise individual sets of route segments, are possible for each HCV corridor from the start locations or areas and end locations or areas. Furthermore, in some examples, each HCV corridor can be directional in nature such that an HCV traveling along a particular route (of many possible directional routes through the HCV corridor) must begin at the start location or area and finish the HCV corridor at the end location or area. In variations, an HCV may be routed into an HCV corridor at any point after the start location and can also be routed out of the corridor at any point before the end location (e.g., in response to real-time increases or decreases in transport demand within the corridor).

A computing system is provided herein that utilizes the HCV corridors to coordinate pick-ups and drop-offs of requesting riders/users by HCVs. The HCVs can each be operated by a driver or, in some aspects, can comprise autonomous HCVs. For human driven aspects, the driver of an HCV can input an available or on-duty state on a transport service application that communicates with the computing system. After detecting the available or on-duty state of a driver of an HCV, the computing system can route the driver, via instructions sent to the transport service application, to a start point of a particular HCV corridor. Accordingly, each HCV corridor can have any number of HCVs being directionally routed from a start point to an end point through the HCV corridor and any number of HCVs being directionally routed to a start point for the corridor.

The computing system can detect HCVs coming online, which can indicate the availability of the HCVs to service transport requests. For example, the driver of an HCV can input an available or on-duty state on a transport service application that communicates with the computing system. After detecting the available or on-duty state of a driver of an HCV, the computing system can route the driver, via instructions sent to the transport service application, to a start point of a particular HCV corridor. Accordingly, each HCV corridor can have any number of HCVs being directionally routed from a start point to an end point through the HCV corridor.

In various examples, the computing system can monitor transport demand within each of a plurality of HCV corridors (or within a threshold distance from the HCV corridors) throughout the geographic region. In certain implementations, the computing system can further determine an established supply flow schedule for each of the plurality of corridors. In various implementations, the supply flow schedule for a specified HCV corridor can be established based on historical utilization data indicating transport demand (e.g., a forecasted demand corresponding to the specified HCV corridor) and can indicate a start interval or cadence for HCVs entering the start area of a respective HCV corridor. The supply flow schedule can comprise timing intervals for directing HCVs to the start location or area of a corridor. The computing system can then use the timing intervals to transmit instructions to computing devices associated with HCVs to provide service through the specified corridors at specified times corresponding to the timing intervals to maintain supply flow equilibrium through each of the HCV corridors.

The computing system can determine the supply flow schedule for each corridor by executing one or more algorithms of a scheduling model that uses the number of HCVs in the geographic region, the travel time from the start area or location to the end area or location of each corridor in the geographic region, the travel time from the end area or location of each corridor in the geographic area to the start area or location of every corridor in the geographic area, and/or the expected or forecasted demand for the transport service through each corridor in the geographic region. The expected demand for each corridor can be based on historical utilization data and can be determined by the scheduling model, which estimates the number of expected trips for each particular corridor depending on a given time interval between HCVs assigned to that particular corridor.

The scheduling model can output a set of route timing intervals that are configured to maintain consistent supply flow across the geographic region. For example, one route timing interval may specify sending one HCV every fifteen minutes to provide service along a given corridor, whereas a busier corridor may have a route timing interval of one HCV every two minutes. The computing system can monitor the state of supply flow in the geographic region and periodically (e.g., every twenty seconds) assign HCVs to corridors in accordance with the supply flow schedules, as best as possible. It is contemplated that at any given time, the number of available drivers and their respective locations may not align ideally (or never align ideally) with the start locations and supply flow schedules of HCV corridors. However, the computing system described herein may utilize the supply flow schedules to assign HCVs to corridor in a "best fit" manner. That is, the computing system can endeavor to adhere to the supply flow schedules as best as possible, even if the schedules are never actually perfectly met.

It is further contemplated that the computing system can respond to real-time conditions in each HCV corridor, and update the route timing intervals for the HCV corridors in response. In doing so, the computing system can alleviate or prevent any supply flow issues, such as local aggregation of HCVs at certain points within the corridor.

Based at least in part on the real-time demand data and/or the supply flow schedule of each corridor, the computing system can match the available and unassigned HCVs with HCV corridors, and subsequently, the HCVs can be instructed, via notifications or messages to respective computing devices, to travel to a start location of the matching corridor at an indicated time or time range. At any given time, the computing system can monitor real-time demand conditions within the HCV corridors in order to dynamically route HCVs into and out of any particular road segment of any particular HCV corridor. Furthermore, at any given time, each HCV corridor can be associated with one or more demand thresholds or supply/demand ratio thresholds that can determine whether or not to route upcoming HCVs into, out of, or between corridors.

The computing system can receive transport requests from requesting users throughout the geographic region. In one example, the computing system can determine whether the pick-up location and the destination location of the transport request fits within a particular HCV corridor, and if so, the computing system can match the requesting user to the HCV corridor and determine an optimal pick-up location for the requesting user to rendezvous with an upcoming HCV operating within the matching corridor. In another example, the requesting user can specifically request the HCV service as part of the transport request, or the requesting user can operate a designated service application for requesting HCVs. In such examples, the computing system can determine which particular HCV corridor is best suited for the transport request.

As provided herein, the upcoming HCV may be operating along a current route, which the computing system can dynamically alter at any given time based on received transport requests from requesting users (e.g., requests received in a forward operational direction of the HCV within the corridor, such as after the HCV has departed from the start location or area). According to one example, the computing system may alter the dynamic route for each HCV based on a cost function that outputs a weighted cost for diverging the HCV based on an optimization of various factors, such as an arrival time of the upcoming HCV to each of one or more possible pick-up locations, traffic conditions through each possible route, a wait time for the requesting user, an added time for the upcoming HCV to diverge from the current route, a number of current passengers of the upcoming HCV, current transport demand and/or forecasted transport demand on other possible routes of the matching HCV corridor, and the like.

In additional implementations, the computing system can monitor real-time transport demand and HCV supply conditions in each HCV corridor, and can dynamically instruct the drivers of HCVs or cause the HCVs to enter any specified segment of a corridor, travel between corridors, and/or exit any particular segment of a corridor. For example, the computing system can determine that real-time HCV transport demand has become thin in a forward operational direction of an HCV operating through a particular corridor (e.g., below a threshold ratio of demand versus HCV supply), while demand has spiked in a nearby corridor. In such examples, the computing system can route the HCV out of its current corridor and into any particular segment of the nearby corridor. In responding to real-time transport demand in each corridor, the computing system can utilize dynamic routing, scheduling, and gate keeping techniques described herein.

As provided herein, an "HCV corridor" can correspond to a segment of a road network that traverses across a given area (e.g., a metropolitan area). The HCV corridor can encompass more than one parallel road at any given portion and can further comprise multiple fixed or dynamic pick-up and drop-off locations over the course of the HCV corridor. Accordingly, any number of routes (e.g., hundreds or thousands) through the HCV corridor are possible. Furthermore, the HCV corridor can be directional in nature, such that HCVs traversing through the HCV corridor generally traverse through the HCV corridor in one direction (e.g., as directed or coordinated by dynamic routing resources of a remote computing system). In various implementations, the HCV corridor can further be managed in accordance with an inflow schedule, such that individual HCVs enter the start point of the corridor at established time intervals. In such examples, the determination of the inflow schedule can be based on historical demand data compiled by the computing resources of the on-demand transport service (e.g., based on various transport options offered by the transport service).

Among other benefits, the examples described herein achieve a technical improvement upon existing high capacity transit options involving fixed routes, fixed schedules, and fixed pick-up and drop-off locations. Using historical data of existing on-demand transport, the computing system described herein can establish optimal corridors through a given region based on "hot spot" pick-up and drop-off areas, and dynamically route HCVs through such corridors based on real-time transport requests received from users of the on-demand transport service. In addition, through computer modeling, the computing system can more efficiently allocate resources throughout a geographic area in order to maintain supply flow equilibrium.

It is further contemplated that implementations described herein can further increase high capacity transit usage for any given transport service region, thereby reducing the costs of transport as well as traffic congestion and harmful vehicle emissions caused by more individualized transport options.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) systems, network equipment (e.g., routers) and tablet devices. Memory, processing, and network resources may all be used in connection with the establishment, use, or performance of any example described herein (including with the performance of any method or with the implementation of any system).

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be executed. In particular, the numerous machines shown in some examples include processors and various forms of memory for holding data and instructions. Examples of computer-readable media include permanent memory storage devices, such as hard drives on personal computers or servers. Other examples of computer storage media include portable storage units, such as CD or DVD units, flash or solid-state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

As provided herein, the term "autonomous vehicle" (AV) describes any vehicle operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as on highways. More advanced AVs, such as those described herein, can operate in a variety of traffic environments without any human assistance. Accordingly, an "AV control system" can process sensor data from the AV's sensor array and modulate acceleration, steering, and braking inputs to safely drive the AV along a given route.

Corridor Overview

FIG. 1 illustrates a portion of a road network map 100 including visualizations of route corridors through which high capacity vehicles (HCVs) may be dynamically routed to service transport requests, according to examples provided herein. In the example shown in FIG. 1, the road network map 100 can include a number of directional HCV corridors 102, 104, 106, 108 through which an HCV fleet may be routed. In various implementations, the HCV corridors 102, 104, 106, 108 may be selected based on historical data indicating pick-up and drop-off hot spots throughout a transport service region. Furthermore, each HCV corridor 102, 104, 106, 108 is distinct from a fixed route (e.g., such as a bus route). Specifically, each corridor 102, 104, 106, 108 can encompass multiple possible routes.

Further shown in FIG. 1 are pick-up and drop-off locations 113 (signified by the points within the corridors 102, 104, 106, 108). In certain implementations, these locations 113 can comprise fixed locations that are preselected based on historical data compiled for an on-demand transport service. Accordingly, as HCVs are routed through each directional corridor 102, 104, 106, 108, a remote computing system can dynamically route the HCVs to any particular pick-up/drop-off location 113 depending on real-time transport requests received within that corridor (e.g., which can include the current location of a requesting user and an inputted destination).

While the corridors 102, 104, 106, 108 shown in FIG. 1 generally include straight line boundaries or edges, it is contemplated that certain corridors may have any shape or configuration from a starting area to an ending area. For example, a corridor may have a curvy or irregular shape (e.g., a snakelike shape) that traverses through the road network map 100. In variations, a corridor may include multiple parallel roads with various other roads intersecting throughout the corridor.

As an example, a remote computing system (described below with respect to FIG. 2) can route an HCV that comes online (e.g., indicating availability) to a start location or area 103 (hereinafter "start area 103") of directional corridor 102. From the start area 103, the HCV can receive match data or routing data, indicating one or more upcoming pick-up or drop-off locations, or routing information to a sequential set of pick-up/drop-off locations through the corridor 102. As provided herein, the corridor 102 may include any number of pick-up/drop-off locations from the start area 103 to the end of the corridor 102. In one aspect, the computing system can transmit sequential locations dynamically as the HCV operates through the corridor 102. In variations, the computing system can actively and dynamically route the HCV through the corridor based on a variety of factors, as discussed below with respect to FIG. 2.

It is contemplated that the use of corridors for HCVs through a given road network can fulfill a significant percentage of transport requests for a transport service region (e.g., 30-40%), and can provide a cost advantage over current rideshare implementations. Furthermore, the use of HCVs through these corridors can significantly reduce fuel consumption and traffic through optimization of the number of HCVs routed through each corridor, the cadence or interval of HCVs through any given segment of the corridor (e.g., which can respond to real-time and/or forecasted demand conditions), and the active movement of HCVs between corridors based on highly local demand conditions (e.g., from end areas to start areas of respective corridors).

It is further contemplated that the corridors may also be utilized for regular rideshare vehicles. In such examples, the computing system can route a combination of HCVs and other vehicles (e.g., standard rideshare vehicles, carpool vehicles, etc.) through the corridors to meet additional demand. As provided herein, an HCV can comprise a passenger vehicle with a capacity beyond a standard full-size vehicle (e.g., a four-door sedan). For example, an HCV can have a passenger capacity of more than five passengers (e.g., ten to twenty passengers) and can include large SUVs, vans, and buses.

System Description

Figure 2:
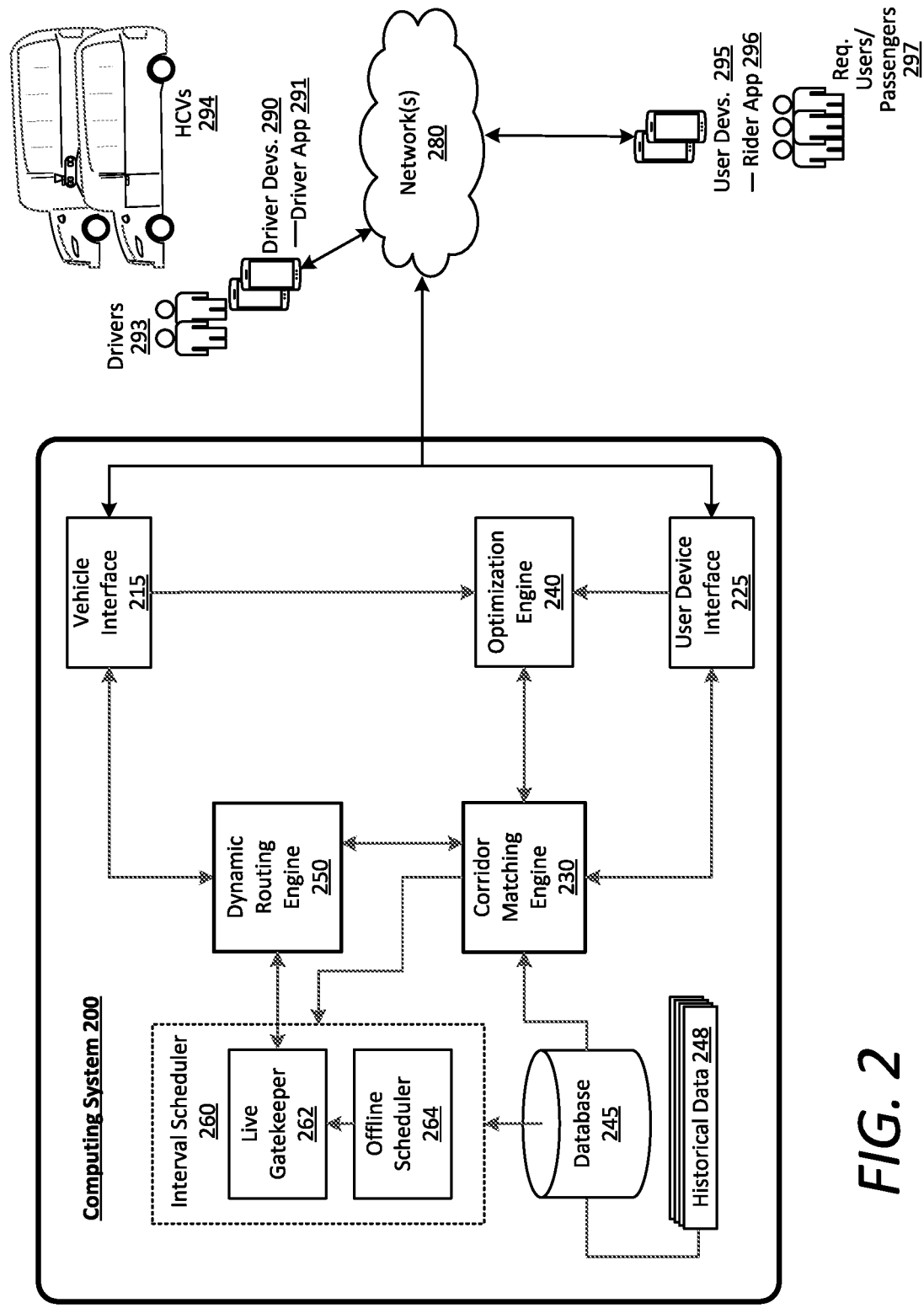
FIG. 2 illustrates computing system for coordinating navigation of HCVs through established corridors, in accordance with examples described herein.

FIG. 2 illustrates computing system 200 for coordinating navigation of HCVs through established corridors in connection with an on-demand transport service, according to examples described herein. The computing system 200 can include a vehicle interface 215 that can communicate over one or more networks 280 with HCVs 294 operating throughout a given transport service region (e.g., a metropolitan area, such as Manhattan, New York). In certain examples, the vehicle interface 215 can communicate directly with on-board computing systems of the HCVs (e.g., for autonomous HCVs, but also human-driven HCVs with robust computing resources). Additionally or alternatively, the vehicle interface 215 can communicate with the computing devices 290 of the drivers 293 of the HCVs 294 (e.g., via an executing driver application 291 that enables the driver 293 to provide an availability status).

In various implementations, the vehicle interface 215 can receive location data (e.g., GPS data) from the HCVs 294 and/or driver devices 290. The location data can indicate the current location of the HCV 294 as it operates throughout the transport service region. According to examples provided herein, the driver 293 can input, via the executing driver app 291, an availability status to service HCV ride requests. Based on the location data, a dynamic routing engine 250 of the computing system 200 can dynamically route the driver 293 and HCV 294 to a start area of an optimal corridor, and then dynamically route the driver 293 and HCV 294 through the corridor to an end area.

The computing system 200 can further include a user device interface 225 that can communicate over the network (s) 280 with the computing devices 295 of users 297 of the on-demand transport service (e.g., via an executing rider application 296). The user device interface 225 can receive transport requests from the user devices 295, which can include a current location, an inputted pick-up location, and/or a destination. In various examples, each transport request can indicate a transport service option, such as a standard rideshare option, a carpool option, a luxury vehicle option, or an HCV option. For example, the user 297 can interact with a user interface of the rider application 296 to select any particular transport option. If the current location of the user 297 and the destination inputted by the user 297 match within the boundaries of—or within a threshold distance of—an HCV corridor, the rider application 296 can display the HCV option. It is contemplated that this HCV option can include an upfront cost that is significantly lower than the other options.

Upon receiving an HCV transport request, a corridor matching engine 230 can match the user 297 with a specified corridor based on the current location and destination of the user 297. Specifically, the corridor matching engine 230 can identify a directional HCV corridor that encompasses or closely encompasses the current location and destination of the user 297. For example, the user 297 may be within a three-minute walking distance to the edge of a corridor, and/or the destination of the user 297 may be within a three-minute walking distance of a nearby corridor. Based on this close proximity, the corridor matching engine 230 can match the user 297 to the matching corridor and coordinate with an optimization engine 240 that can identify (i) a most optimal rendezvous location and/or drop-off location for the user 297, and (ii) an upcoming HCV 294 within the matching corridor.

In various examples, the corridor matching engine 230 may identify that the requesting user 297 matches multiple corridors, in which case the optimization engine 240 can perform additional optimizations to determine a most optimal corridor and/or HCV 294 for the user 297. In such examples, the optimization engine 240 can account for each of the optimization factors for each of the multiple corridors described herein, such as whether an upcoming HCV 294 needs to be diverted from a current route and/or the added cumulative delay for each passenger of the upcoming HCV 294.

In certain implementations, the HCV 294 can travel a default or standard route through the corridor, which can be deviated by the dynamic routing engine 250 at any time. For example, the default route can be based on historical transport demand data indicating the most probable fixed locations along the route where requesting users 297 will be located, picked up, and/or dropped off. In some aspects, these most probable locations can be temporally dependent. For example, an HCV 294 traversing the corridor at 8:00 am may travel a different default route than an HCV 294 traversing the corridor at 3:00 pm. However, based on real-time transport requests, the dynamic routing engine 250 and optimization engine 240 can choose to deviate the HCV 294 from its default route.

Specifically, the optimization engine 240 can receive the location and/or current route information of one or more upcoming HCVs and a set of estimated times of arrival (ETAs) of each of the one or more upcoming HCVs to a set of candidate pick-up locations. The optimization engine 240 can further determine an ETA of the user 297 to each candidate pick-up location and select a rendezvous location for the user 297 and upcoming HCV 294 based at least in part on the ETAs. Thereafter, the dynamic routing engine 250 can provide the selected rendezvous location, or routing data comprising turn-by-turn directions to the selected rendezvous location, to the upcoming HCV 294.

Additionally or alternatively, the optimization engine 240 can select a pick-up location based on transport supply and demand parameters, such as other transport requests within the corridor and a weighted cost for deviating the HCV 294 from its current route. For example, the upcoming HCV 294 may be operating along a current route, which the dynamic routing engine 250 can alter at any given time based on output from the optimization engine 240. Specifically, received transport requests from requesting users 297 in a forward operational direction of the upcoming HCV 294 within the corridor can be factored into the weighted cost for deviating the HCV 294 as determined by the optimization engine 240 (e.g., after the HCV has departed from the start location or area).

According to one example, the optimization engine 240 can execute a cost function to output the weighted cost for diverging the HCV 294 to an optimal pick-up location based on an optimization of various factors, such as an arrival time or ETA of the upcoming HCV 294 to each of one or more possible pick-up locations, a wait time for the requesting user 297 at each of the locations, a total added time for the upcoming HCV 294 to diverge from the current route to pick up the user 297, a number of current passengers of the upcoming HCV 294, current transport demand and/or forecasted transport demand on other possible routes of the matching HCV corridor or neighboring corridors, supply efficiency through the corridor (e.g., whether HCVs are aggregating or stacking and the locations or areas of the stacking or aggregation), any previous divergences in the upcoming HCV's route, and the like.

Based on the weighted cost, the dynamic routing engine 250 can determine whether to divert the upcoming HCV 294 or await a next HCV 294 to rendezvous with the user 297. In various examples, the weighted cost also factors in the wait time of the requesting user 297, so the optimization engine 240 can prevent the user 297 from having a lengthy wait time. Furthermore, it is contemplated that the weighted cost can fluctuate based on the dynamic conditions of the scenario. For example, the weighted cost for diverging the HCV 294 can decrease with increased wait times for the user 297. As another example, the weighted cost for diverging the HCV 294 can generally increase based on an increased number of current passengers within the HCV 294 (e.g., due to a higher cumulative added time and inconvenience for diverging the HCV 294).

In various implementations, the computing system 200 can also include or access a database 245 storing historical utilization data 248 of the transport service region. The historical utilization data 248 can comprise data enabling an interval scheduler 260 to forecast demand through each directional HCV corridor. Specifically, the historical utilization data 248 can indicate—physically and temporally— the hot spots for pick-ups and drop-offs for each corridor. The interval scheduler 260 can include an offline scheduler 264 that parses and analyzes these data 248 to determine and establish a schedule for HCVs 294 entering the corridor and/or traversing through any particular segment of the corridor.

In some aspects, the offline scheduler 264 computes a set of route timing intervals, one for each route corridor, that represent how often an HCV should start providing service along a route. In one implementation, when computing the timing intervals, the offline scheduler 264 uses linear programming, or linear optimization, to solve a supply budget optimization problem to maximize one or more service objectives for the on-demand transport service. For example, one service objective may be the number of requests fulfilled in a given time period, subject to the constraint that the supply flow remains in relative equilibrium throughout the geographic region. In other aspects, the service objectives can include minimizing costs for the service, maximizing revenues or profits for the service, maximizing user satisfaction with the service, etc. The offline scheduler 264 can also optimize based on multiple service objectives, with each service objective weighted by a relative importance factor. In some variations, the offline scheduler 264 may disable a corridor entirely if it predicts that too few requests (i.e., a number beneath a programmed threshold) are likely to be fulfilled with the computed timing interval for that corridor.

The interval scheduler 260 can further include a live gatekeeper 262 that receives the set of timing intervals (or a schedule created from the set of timing intervals) from the offline scheduler 264 and communicates with the computing devices 290 of the drivers 293 and/or the HCVs 294. As drivers 293 and/or HCVs 294 come online (e.g., indicating availability), the live gatekeeper 262 can seek to achieve the established start interval for each corridor of the transport service region. It is to be noted that the drivers 293 can come online at their own discretion, and generally are not beholden to any particular schedule (e.g., besides completing a corridor once started). Accordingly, for each corridor, the established schedule by the offline scheduler 264 may not be accomplished by the live gatekeeper 262.

In further implementations, the live gatekeeper 262 can respond to real-time supply-demand conditions of the HCV transport service, as well as the routing conditions within each corridor. For example, the live gatekeeper 262 can receive input from the corridor matching engine 230 and dynamic routing engine 250, which can indicate route divergences, pick-up locations, current locations and updated routes of each HCV within each corridor, and/or the current locations of the users 297. Generally, if real-time demand in a corridor decreases, the live gatekeeper 262 can increase the start interval for HCVs entering the corridor. If real-time demand increases, the live gatekeeper 262 can decrease the interval accordingly.

In some aspects, the live gatekeeper 262 can scan the real-time supply conditions of the geographic region on a programmed schedule (e.g., every twenty seconds). If the supply conditions deviate from the predicted conditions that were used to create the offline schedule by more than a threshold amount, the live gatekeeper 262 can recalculate the timing intervals for the corridors to more closely match conditions, thereby maintaining supply flow equilibrium in the region.

According to examples described herein, the live gatekeeper 262 can communicate with the driver application 291 of the computing devices 290 of the drivers 293 or the on-board computing devices of the HCVs 294 to achieve the configured start interval for each corridor. For example, if an HCV is early to the start area, the live gatekeeper 262 can request, via the driver application 291, that the HCV 294 hold or wait prior to entering the start area of the corridor. At the desired start time, the live gatekeeper 262 can transmit a message, or content can be displayed via the driver app 291, indicating that the driver may proceed.

It is further contemplated that not only the start interval, but the supply flow of HCVs 294 within the corridors can be manipulated by the live gatekeeper 262 through communications with the drivers 293 and/or HCVs 294. For example, the live gatekeeper 262 can utilize wait requests at any point within the corridor for any particular HCV 294 traversing through the corridor to, for example, prevent stacking or aggregation of HCVs 294 within the corridor that crosses a given threshold of the desired interval (e.g., one HCV 294 every two hundred seconds with a time threshold of plus or minus twenty seconds).

Specifically, the live gatekeeper 262 can communicate with the HCVs 294 or drivers 293 to detect when the HCVs 294 come online. In various implementations, the live gatekeeper 262 can determine a supply flow schedule for each HCV corridor from the offline scheduler 264 and attempt to meet the supply flow schedule by coordinating with the HCVs 294 to arrive at the start area of designated HCV corridors at specified times. In doing so, the supply flow schedule for each HCV corridor may not be met, but rather the live gatekeeper 262 assigns individual HCVs 294 to specified corridors based on various factors in order to meet the supply flow schedule of each HCV corridor as best as possible. Thus, while the ideal supply flow schedule may be established—predetermined by the offline scheduler 264 based on factors such as historical demand data, weather conditions, traffic conditions, time of day, day of the week, any particular events along the corridor, etc.—the live gatekeeper 262 assigns HCVs 294 dynamically as they come online and complete individual corridors in accordance with the established schedules.

For example, when an HCV 294 comes online (e.g., the driver 293 of the HCV 294 initiates the driver application 291 on a computing device 290 to indicate availability), the live gatekeeper 262 can reference the current supply flow schedules for a candidate set of HCV corridors (e.g., corridors having start areas that are within a predetermined proximity from the current location of the HCV 294). The live gatekeeper 262 can further factor in other HCVs 294 coming online at particular locations, and/or forecast a number of available HCVs at a future period of time within a certain proximity of corridor start areas. In various examples, the live gatekeeper 262 can further factor in a capacity of the HCV 294 (e.g., a number of passenger seats) in making a corridor assignment. In such a scenario, the live gatekeeper 262 can also forecast localized demand within each corridor of the candidate set of HCV corridors. The live gatekeeper 262 may then assign the HCV 294 to a specified corridor based on the forecasted localized demand, the supply flow schedules of each corridor, the current demand within each corridor, the current supply of HCVs 294 traversing through each corridor and/or en route to the start area of each corridor, the seating capacity of the HCV 294, and the like.

Accordingly, for each HCV 294 coming online or completing an HCV corridor, the live gatekeeper 262 can perform an optimization based on the forgoing factors in order to ultimately assign the HCV 294 to a particular corridor at which point the driver of the HCV 294 or the HCV 294 itself (e.g., in autonomous implementations) can drive to the start area of the assigned HCV corridor. In oversupplied scenarios where more HCVs 294 are currently online than needed (e.g., as determined by the current supply flow schedules established by the offline scheduler 264), the live gatekeeper 262 can transmit wait instructions to the HCVs 294 to queue the HCV 294 prior to entering the corridor. As described herein, the supply flow schedule of the corridor can comprise a current start interval for HCVs 294 entering the corridor. The current start interval can change throughout the day based on current and/or forecasted demand.

As an example, the current start interval for the assigned HCV corridor can be two-hundred seconds, such that the supply flow schedule for the corridor indicates that an HCV 294 ideally enters the corridor at the start area every two-hundred seconds. In oversupplied scenarios, the live gatekeeper 262 can manage a start queue at the start area of the HCV corridor by transmitting a wait instruction to HCVs 294 in the start queue. Every two-hundred seconds, the live gatekeeper 262 can transmit proceed instruction to a next HCV 294 in the start queue, which can enable the next HCV to enter the corridor at the specified start interval. Accordingly, in oversupplied scenarios, the live gatekeeper 262 can precisely meet the supply flow schedule of the HCV corridor.

In variations, the live gatekeeper 262 can respond to current demand conditions within the corridor and adjust the start interval accordingly. For example, the live gatekeeper 262 can receive inputs from the corridor matching engine 230 and dynamic routing engine 250 identifying the current routes traveled through the corridor by each HCV 294 traversing the corridor. The live gatekeeper 262 can receive further inputs indicating the number of available seats of each HCV 294, and whether any HCVs 294 are at full capacity. In addition, the live gatekeeper 262 can generally determine whether HCV transport demand within the corridor exceeds the current supply of available seats of the HCVs within the corridor, and/or if any localized demand from requesting users 297 within the corridor is being deprioritized for increased demand elsewhere in the corridor (e.g., adjacent to that pocket of localized demand such that an upcoming HCV is routed to the increased demand instead). Based on the oversupply of HCVs and the increased demand within the corridor, the live gatekeeper 262 can decrease the start interval of the corridor (e.g., to one-hundred and thirty seconds) to funnel more HCVs 294 through the corridor.

In undersupplied scenarios, the live gatekeeper 262 can strive to achieve the supply flow schedules of each undersupplied corridor as best as possible. For example, the start interval for a particular corridor may be two-hundred seconds, but the actual supply flow of HCVs 294 to the start area of that corridor may only average out to one every two-hundred and twenty seconds. In such a scenario, the live gatekeeper 262 can perform the optimization for all nearby corridors and seek to minimize the interval gap between the start interval of the supply flow schedule and the actual start interval based on the current supply of HCVs 294.

In certain examples, the live gatekeeper 262 can move HCVs 294 into and out of corridors at any particular point along the corridor in response to current demand within the corridor (e.g., in a forward operational direction of the HCV 294 through the corridor), lack of demand within the corridor (e.g., in the forward operational direction of the HCV 294), demand conditions in nearby corridors, current passenger capacity (e.g., whether the HCV 294 if full), and the like. Additionally, the live gatekeeper 262 can also transmit wait commands to HCVs 294 at any particular point in the corridor in order to maintain the supply flow cadence through the corridor at a relatively constant rate (e.g., one HCV 294 through any particular segment of the corridor every two-hundred seconds). Accordingly, if stacking or HCV aggregation begins to occur within a corridor due to dynamic routing, the live gatekeeper 262 can cause one or more HCVs to wait or slow down in order to reestablish the supply flow cadence. Further description of the functions of the live gatekeeper 262 are described below with respect to FIGS. 4 and 5.

Computing Device

Figure 3:
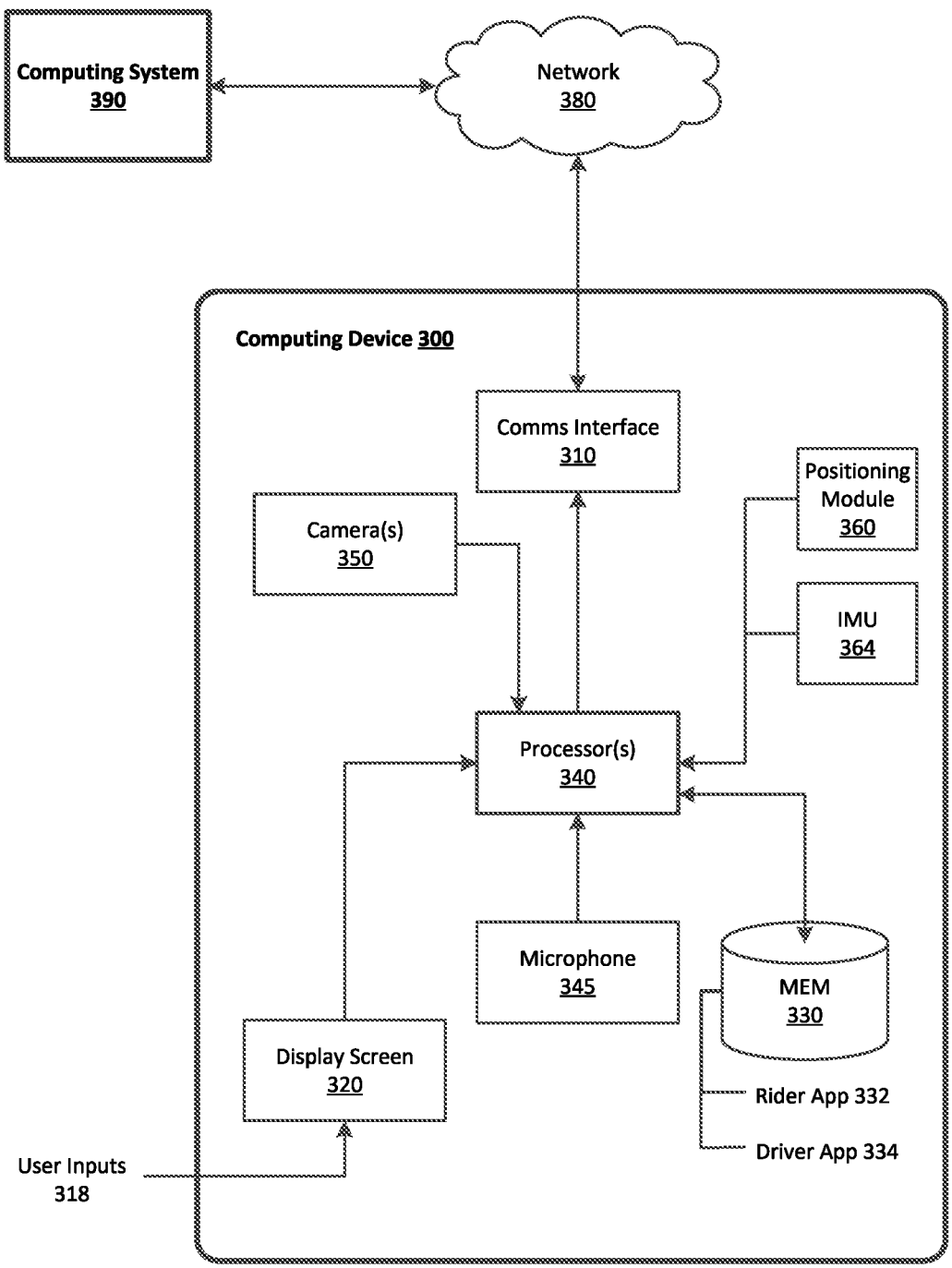
FIG. 3 is an example computing device utilized by requesting users and drivers of an on-demand transport service, as described herein.

FIG. 3 is an example computing device utilized by requesting users and drivers of an on-demand transport service, as described herein. In many implementations, the computing device 300 can comprise a mobile computing device, such as a smartphone, tablet computer, laptop computer, VR or AR headset device, and the like, and can be controlled by either a human driver 293 or a requesting user 297 described with respect to FIG. 2. The computing device 300 can include typical telephony features such as a microphone 345, one or more cameras 350 (e.g., a forward-facing camera and a rearward-facing camera), and a communication interface 310 to communicate with external entities using any number of wireless communication protocols. The computing device 300 can further include a positioning module 360 and an inertial measurement unit 364 that includes one or more accelerometers, gyroscopes, or magnetometers. In certain aspects, the computing device 300 can store a designated application (e.g., a rider app 332) in a local memory 330. In the context of FIG. 1, the rider app 332 can comprise the rider app 296 executable on the user device 295 of FIG. 2. In variations, the memory 330 can store additional applications executable by one or more processors 340 of the user device 300, enabling access and interaction with one or more host servers over one or more networks 380.

In response to a user input 318, the rider app 332 can be executed by a processor 340, which can cause an app interface to be generated on a display screen 320 of the computing device 300. The app interface can enable the user to, for example, configure an on-demand transport request, or display turn-by-turn map or walking directions (e.g., based on route data transmitted by the network computing system 390). In various implementations, the app interface can further enable the user to enter or select a destination location (e.g., by entering an address, performing a search, or selecting on an interactive map). The user can generate the transport request via user inputs 318 provided on the app interface. For example, the user can input a destination, select a transport service option to configure the transport request, and select a request feature that causes the communication interface 310 to transmit the transport request to the network computing system 390 over the one or more networks 380.

As provided herein, the rider application 332 can further enable a communication link with a network computing system 390 over the network(s) 380, such as the computing system 100 as shown and described with respect to FIG. 1. The processor 340 can generate user interface features (e.g., map, request status, etc.) using content data received from the network computing system 390 over the network(s) 380.

The processor 340 can transmit the transport requests via a communications interface 310 to the backend network computing system 390 over the network 380. In response, the computing device 300 can receive a confirmation from the network system 390 indicating the selected driver that will service the request. In various examples, the computing device 300 can further include a positioning module 360, which can provide location data indicating the current location of the requesting user to the network system 390 to, for example, determine the rendezvous location.

For drivers, the computing device 300 can execute a designated driver application 334 that enables the driver to input an on-duty or available status. In some examples, the driver app 334 can further enable the driver to select one or multiple types of transport service options to provide to requesting users, such as a standard on-demand rideshare option, a carpool option, or an HCV option. For the latter option, the computing system 390 can coordinate with the driver to route the driver to the start area of an optimal corridor, provide dynamic routing updates based on transport requests in a forward operational direction of the HCV through the corridor, and perform the live gatekeeping operations, as described herein.

Methodology

Figure 4:
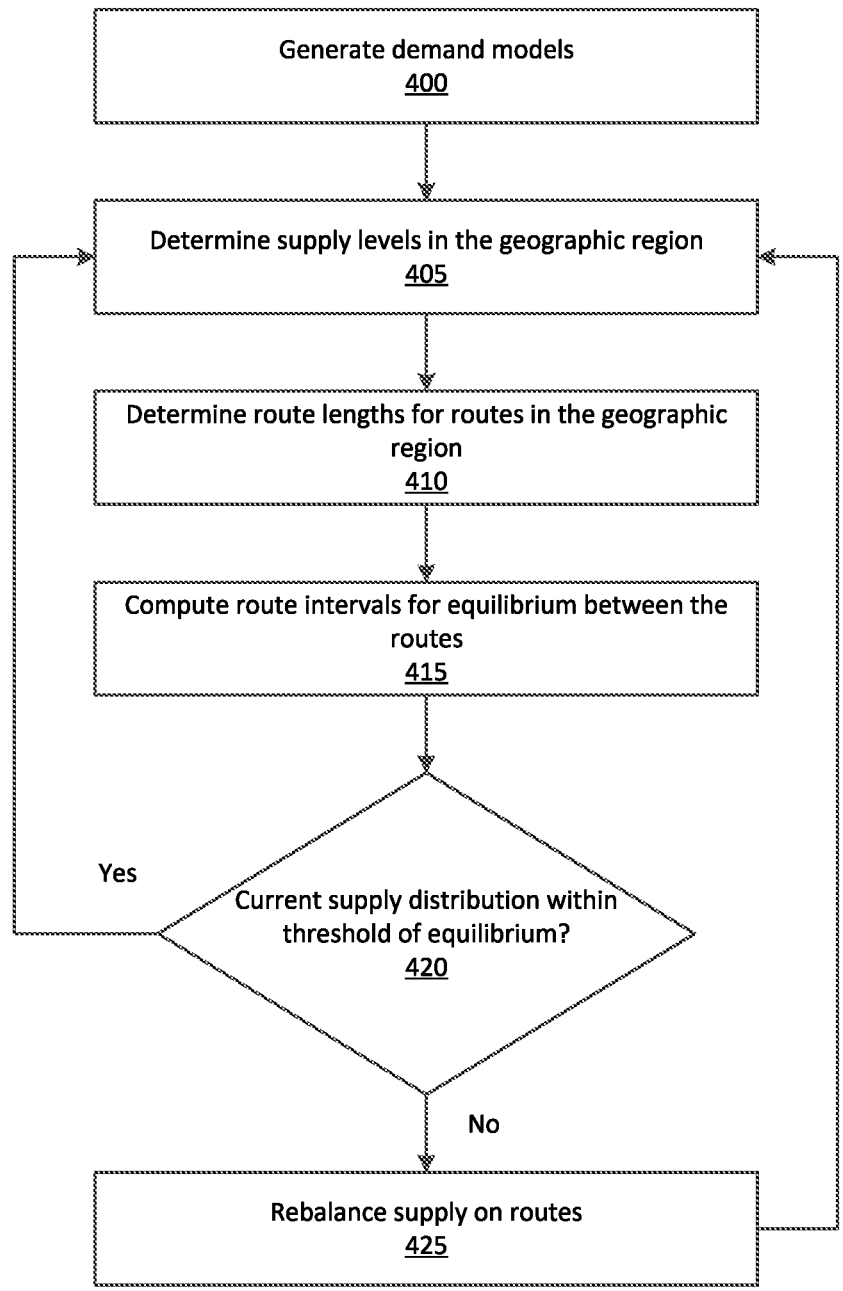
FIGS. 4 and 5 are flow charts describing example methods of computing and using timing intervals for vehicles through established corridors of a transport service region.
Figure 5:
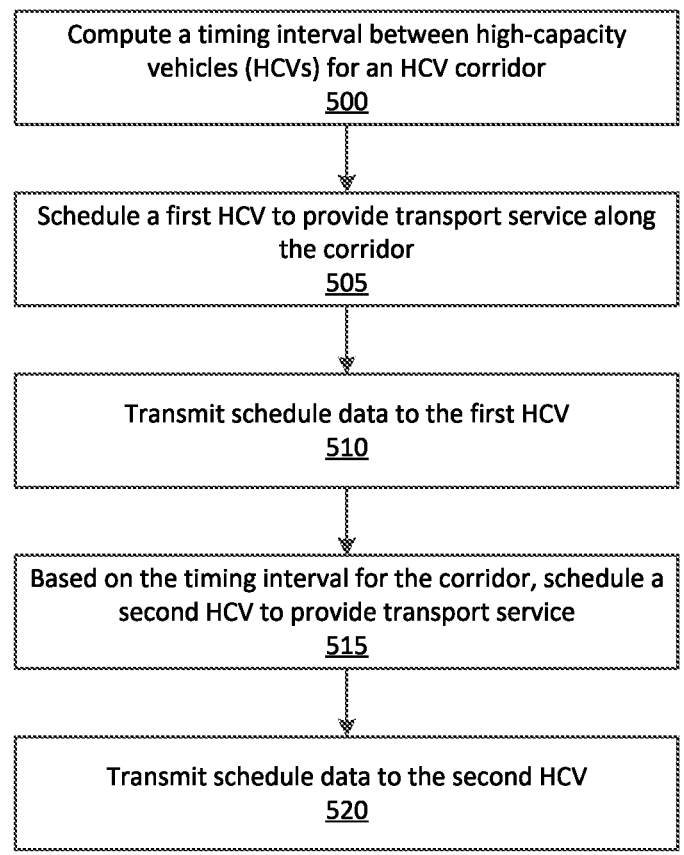

FIGS. 4 and 5 are flow charts describing example methods of computing and using timing intervals for vehicles through established corridors of a transport service region, according to examples described herein. In the below descriptions of FIGS. 4 and 5, reference may be made to reference characters representing like features shown and described with respect to FIGS. 1 through 3. Furthermore, the steps and processes described with respect to FIGS. 4 and 5 below may be performed by an example computing system 200, as described herein with respect to FIG. 2. Still further, any step described with respect to either FIG. 4 or FIG. 5 may be performed in parallel with or replace any other step described. Furthermore, the steps provided in FIGS. 4 and 5 need not be performed in the order described, but rather may be performed in any suitable order, may be performed in parallel to any other particular step, or may be omitted from the process.

Referring to FIG. 4, in some examples, the computing system can generate demand models as part of a method to compute timing intervals between high-capacity vehicles (HCVs) for each of a number of HCV corridors within a geographic region to control rates of HCVs entering and exiting each of the HCV corridors (400). The expected demand for the transport service along each corridor can be determined by a demand model of the expected demand based on a range of possible timing intervals. A shorter interval length results in HCVs being assigned more frequently to provide service along the corridor, e.g., arrive at a start area of the HCV corridor more frequently, whereas a longer interval length results in HCVs being assigned less frequently. The computing system can create these models based on historical service data collected for the geographic region during the course of providing transport or other services, or the historical data can be received from outside sources. The computing system can analyze the historical data to estimate supply and demand based on varying interval lengths.

In some aspects, the computing system determines supply levels in the geographic region (405). In an offline context for creating schedules, the computing system determines the supply levels by predicting supply levels for an upcoming period of time to which the schedule applies. The prediction can be based on the historical service data collected for the geographic region.

The computing system can also determine route lengths for routes in the geographic region (410). In one implementation, the route lengths represent amounts of time that it is expected for an HCV to complete a given route in the predicted conditions. For example, a corridor may have a route length that spans thirty minutes to travel through during a relatively low traffic period of time, and the same corridor may have a route length that spans an hour to travel through during heavy traffic. As with the supply levels, the computing system can determine the route lengths based on the historical service data collected for the geographic region.

Using the demand models of each of the corridors within the region, the determined supply levels, and/or the determined route lengths as input, in some examples, the computing system computes a set of route intervals for the corridors within the region (415). In one implementation, the route intervals are computed to create a schedule that maintains the supply flow in the region in equilibrium. In an equilibrium state, the rate of inflow supply and the rate of outflow supply are equivalent for each corridor's start area and end area over a given time period within a threshold margin of deviation. It is contemplated that at any given time, the number of available drivers and their respective locations may not align ideally (or never align ideally) with the start locations and supply flow schedules of HCV corridors. However, the computing system may utilize the supply flow schedules to assign HCVs to corridor in a "best fit" manner. That is, the computing system can endeavor to adhere to the supply flow schedules as best as possible, even if the schedules are never actually perfectly met.

During operation of the on-demand service, the computing system can monitor the state of supply flow in the geographic region and periodically (e.g., every twenty seconds) assign HCVs to corridors in accordance with the supply flow schedules, as best as possible. Additionally, the computing system can determine whether the current supply distribution is within the threshold margin of deviation from equilibrium (420).

In some aspects, the computing system collects real-time service data and respond to detected conditions in the geographic region. Based on the service data, the computing system can update the route timing intervals for the HCV corridors in order to rebalance the supply on one or more of the routes. In doing so, the computing system can alleviate or prevent any supply flow issues, such as local aggregation of HCVs on one of the routes, and restore the region to the equilibrium state in an efficient manner (425).

FIG. 5 is a flow chart describing scheduling and transmitting schedules to HCVs, according to examples described herein. Referring to FIG. 5, the computing system can compute a timing interval between high-capacity vehicles (HCVs) for each of a plurality of HCV corridors within a geographic region to control rates of HCVs entering and exiting each of the HCV corridors (500).

In some aspects, the computing system computes the timing intervals based on service data stored for the geographic region. The service data can include the number of HCVs providing the transport service or available to provide the transport service in the geographic region, travel times from the start area of each corridor to its corresponding end area, travel times from the end area of each corridor to the start area of every corridor, and an expected demand for the transport service along each corridor.

In some aspects, the computing system controls the rates of HCVs entering and exiting each of the HCV corridors in a manner that optimizes for one or more service objectives, including a number of trips provided within the geographic region during a period of time. In addition, the computing system can control the rates of HCVs entering and exiting each of the HCV corridors such that, for each start area and each end area of each corridor, numbers of HCVs entering that area and numbers of HCVs leaving that area remain balanced over a given time period.

Accordingly, for each of the HCV corridors, the computing system can schedule a first HCV to provide a transport service along the corridor beginning at a first starting time (505). Scheduling the first HCV can include selecting the first HCV based on a determination that the first HCV can arrive at the start area of the corridor at the first starting time.

For each of the HCV corridors, the computing system can transmit, via a network communication interface, first schedule data for the corridor to a computing device of the first HCV, the first schedule data including data indicating the start area of the corridor and the first starting time (510).

The computing system can schedule a second HCV to provide the transport service along the corridor beginning at a second starting time after the first starting time, according to the timing interval for the corridor (515). For example, if the first starting time is 5:00 PM and the timing interval is five minutes, the computing system can schedule the second HCV to provide the transport service along the corridor beginning at 5:05 PM.

The computing system can transmit, via the network communication interface, second schedule data for the corridor to the computing device of the second HCV, the second schedule data including data indicating the start area of the corridor and the second starting time (520).

Figure 6:
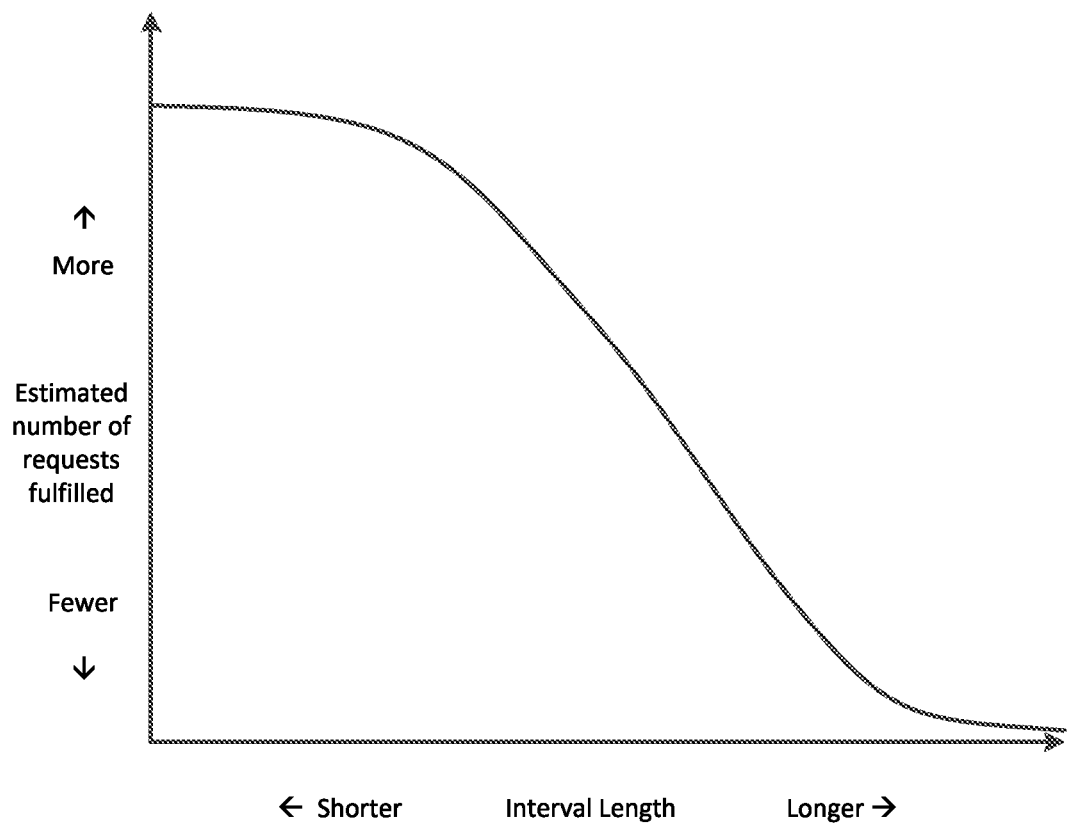
FIG. 6 illustrates a graph of an example demand model for transport service through an established corridor.

FIG. 6 illustrates a graph of an example demand model for transport service through an established corridor. In one aspect, the computing system can use demand models such as the one illustrated in FIG. 6 as part of a method to compute timing intervals between high-capacity vehicles (HCVs) for each of a number of HCV corridors within a geographic region to control rates of HCVs entering and exiting each of the HCV corridors. Accordingly, each corridor can have its own unique demand model graph.

As shown, the x-axis of the example demand model graph represents interval lengths between HCVs within a corridor, with shorter lengths to the left and longer lengths to the right. A shorter interval length results in HCVs being assigned more frequently to provide service along the corridor, whereas a longer interval length results in HCVs being assigned less frequently. The y-axis represents an estimated number of requests fulfilled, with zero at the origin. In general, it is expected that shorter interval lengths for a corridor result in more requests fulfilled within that corridor as there is more supply of HCVs to service the requests and therefore shorter wait times for requesters. This relationship is not necessarily linear, however, as demand may not meet the increasing supply of HCVs as interval lengths become shorter. Similarly, demand may drop off more rapidly as the time between HCVs becomes longer than requesters are willing to wait.

In some aspects, the computing system creates demand models for each of the corridors within the geographic region, or at least some of the corridors within the geographic region. The computing system can create these models based on historical data collected for the geographic region during the course of providing transport or other services, or the historical data can be received from outside sources. The computing system can analyze the historical data to estimate supply and demand based on varying interval lengths. As the transport service operates, the computing system can collect further data with which to refine the demand models for each of the corridors. Thus, the computing system can occasionally update the demand models based on the newly collected data, either on a programmed schedule or in response to a manual request.

When the computing system computes timing intervals between HCVs for corridors within the geographic region, the computing system can use the demand models of each of the corridors within that region as input. Since the computing system optimizes for a service objective over a plurality of corridors and takes into account other service data for the geographic region, including numbers of HCVs providing the transport service (or available to provide the transport service in the geographic region) and travel times within and between corridors, the computing system may compute a timing interval for any individual corridor that is suboptimal. For example, the computing system may compute a long timing interval for a corridor that results in few fulfilled requests if more requests can be fulfilled by allocating the available supply of providers to other corridors in the region.

In another aspect, the computing system can use demand models as part of a method to estimate an optimum number of HCV providers on a given corridor and/or for a geographic region. Based on the cost of adding an additional provider to a corridor and the value that additional supply is expected to generate from the increase in number of requests fulfilled, the computing system can determine how many total HCV providers the geographic region should aim to have. If expected numbers of HCV providers in the region at a given time are below or predicted to be below the determined optimum, the computing system can transfer providers from a neighboring area or encourage other HCV providers to provide service in the area, such as by offering location-based incentives.

Figure 7:
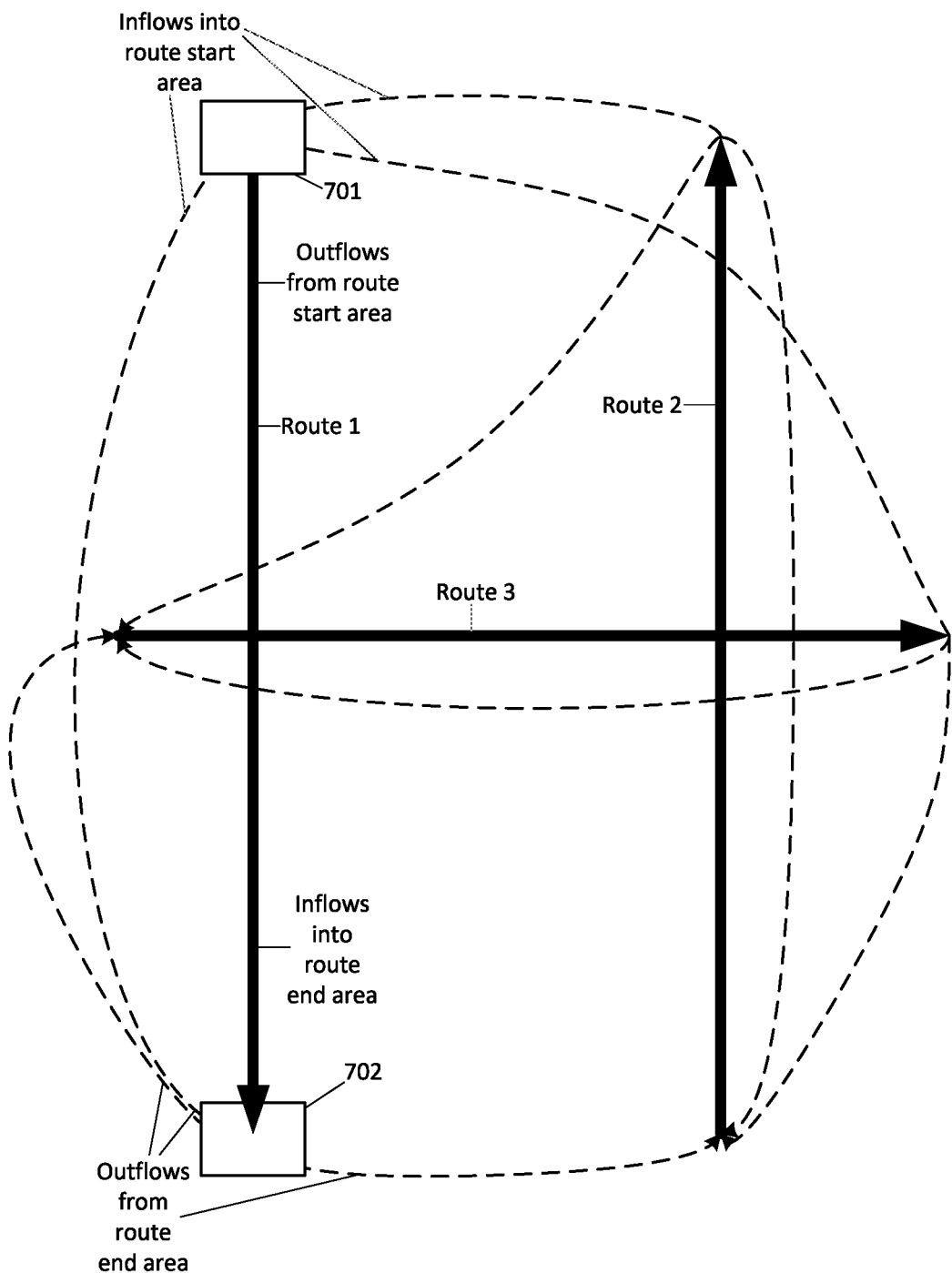
FIG. 7 illustrates an example set of routes with their respective supply inflows and outflows.

FIG. 7 illustrates an example set of routes with their respective supply inflows and outflows. In this simplified geographic region with three routes, Routes 1 and 2 run parallel in opposite directions, and Route 3 runs perpendicular to Routes 1 and 2. In some aspects, the computing system models the geographic region as a graph, with the start areas (i.e., the places where high-capacity vehicles begin providing service along the route) and the end areas (i.e., the places where high-capacity vehicles finish the route) as nodes. The edges of the graph are the routes themselves and the paths between the end areas of each route and the start areas of each route.

As shown in FIG. 7, Route 1 has two nodes: start area 701 and end area 702. The Route 1 start area 701 has inflows from the end areas of each of the routes in the region; HCVs that finish their progress through any of the three routes can travel to the start area 701. The Route 1 start area 701 outflows are the HCVs who are providing service along Route 1. The Route 1 end area 702 inflows are the HCVs that are providing service along Route 1. The Route 1 end area 702 outflows are the HCVs that are traveling from the end area 702 to the start area of any of the routes.

In some aspects, the computing system solves a supply budget optimization problem to maximize one or more service objectives for the on-demand transport service. For example, one service objective may be the number of requests fulfilled in a given time period, subject to the constraint that the supply flow remains in relative equilibrium throughout the geographic region. In other aspects, the service objectives can include minimizing costs for the service, maximizing revenues or profits for the service, maximizing user satisfaction with the service, etc. The computing system can also optimize based on multiple service objectives, with each service objective weighted by a relative importance factor.

In one implementation, with the start areas and end areas of the corridors in the geographic region modeled as nodes, the supply flow of the geographic region is considered to be in equilibrium when the inflows and outflows for each node are balanced. That is, for each start area and each end area of each route corridor, the number of HCVs entering that area and the number of HCVs leaving that area are roughly equivalent over a given time period. Accordingly, to maintain supply flow equilibrium, the computing system uses service data for the region to compute a set of timing intervals, one for each route corridor, that represent how often an HCV should start providing service along a route.

In some aspects, the service data can include predicted numbers of HCVs in the geographic area, predicted travel time from the start area to the end area of each corridor in the geographic area, predicted travel time from the end area of each corridor in the geographic area to the start area of every corridor in the geographic area, and/or the expected or forecasted demand for the transport service for, along, or within each corridor in the geographic area. The expected demand for, along, or within each corridor can be based on a model that estimates the number of expected requests fulfilled for that corridor depending on the time interval between HCVs assigned to that corridor. In some examples, the service data is historical utilization data for the on-demand service stored in one or more databases accessible to the computing system.

In an equilibrium state, the rate of inflow supply and the rate of outflow supply for each node are equivalent over a given time period within a threshold margin of deviation. For the edges of the graph, the rate of supply along an edge is the number of HCVs on that edge divided by the time spent traversing the edge. That is, how many vehicles are traveling between two nodes, and how long it takes a vehicle to make the trip, on average, given the predicted conditions.

Since there are three routes illustrated in FIG. 7, the Route 1 start area 701 has three incoming edges, one from the end areas of each of the route corridors. Accordingly, for Route 1 start area 701, the rate of inflow supply is the sum of the rates of supply on each of the edges, which the computing system calculates by dividing the number of HCVs on the edge by the length, in time, required to traverse the edge. There is only one outflow from the start area 701—Route 1 itself. Thus, the rate of outflow supply from the start area 701 is the number of HCVs providing service along Route 1 divided by the time it takes on average for an HCV to complete Route 1.

For Route 1 end area 702, the rate of inflow supply is the outflow supply from the start area 701: the number of HCVs providing service along Route 1 divided by the time it takes on average for an HCV to complete Route 1. The rate of outflow supply is the sum of the rates of supply on each of the three outgoing edges, which connect to the start areas of each of the routes, including Route 1 start area 701.

By solving a linear system with 2*R equations as constraints, where R is the number of route corridors in the region, the computing system computes a set of timing intervals, one for each of the route corridors, that optimizes for the service objectives while maintaining the supply flow equilibrium of the region. The computing system can create a schedule based on the timing intervals and transmit schedule data at the appropriate times to direct HCVs to the start areas of the routes such that an HCV begins providing service on a route at every timing interval.

In some aspects, the computing system can monitor the real-time positions of HCVs within the region and their destinations in order to determine the number of HCVs on each edge at any time. The computing system can compare the number of HCVs on each edge to how many HCVs should be on each edge in the equilibrium state to determine whether the region is in equilibrium, and if not, how much the state at that time deviates from the equilibrium. The computing system can also estimate how long it should take a vehicle to make the trip, on average, given the current and/or predicted conditions. The computing system can monitor traffic within the geographic region and use real-time and historical data to calculate the time spent traversing an edge or estimate the time needed for a future prediction.

Hardware Diagram

Figure 8:
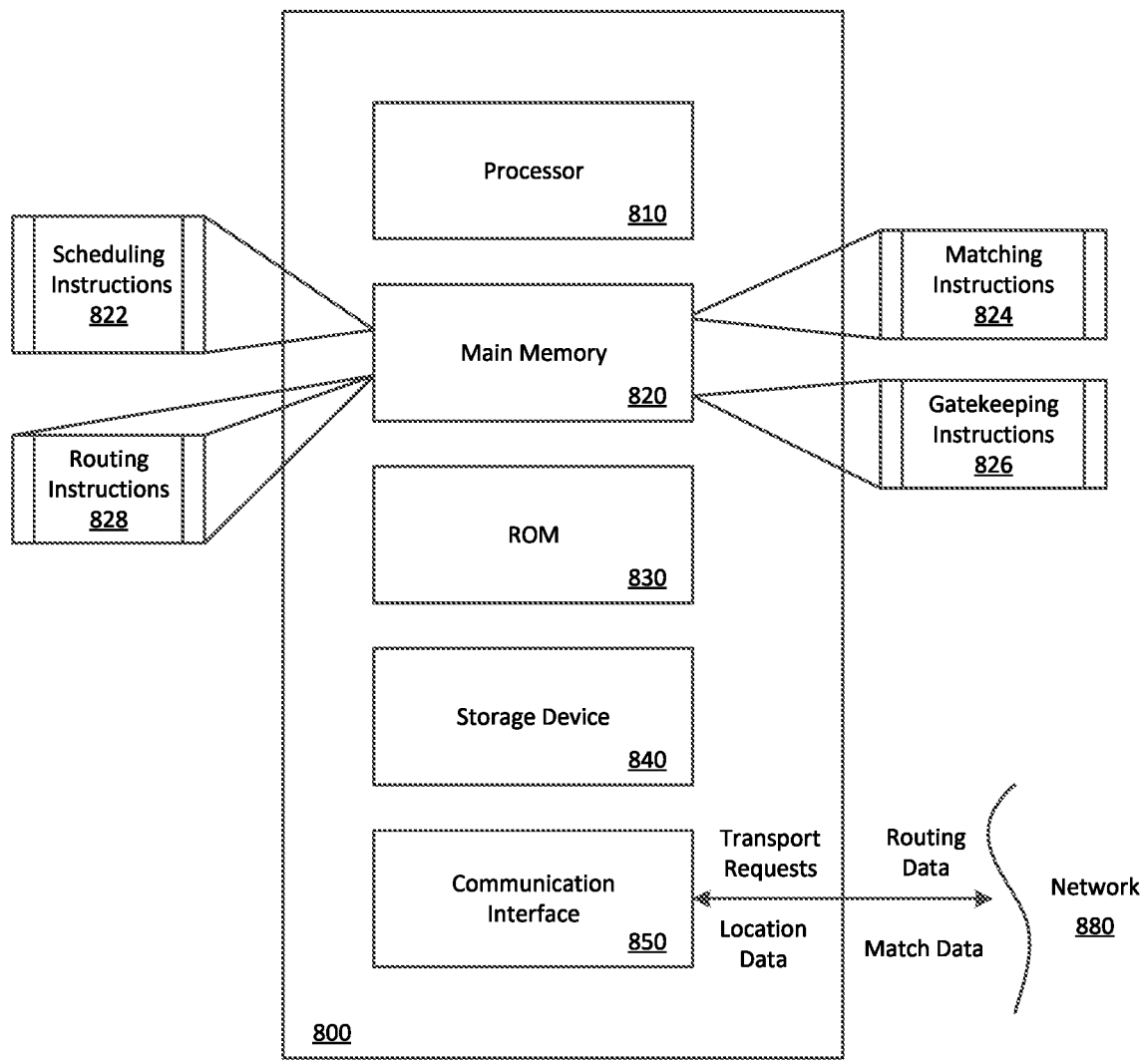
FIG. 8 is a block diagram illustrating an example computer system upon which examples described herein may be implemented.

FIG. 8 is a block diagram that illustrates a computing system upon which examples described herein may be implemented. A computing system 800 can be implemented on, for example, a server or combination of servers. For example, the computing system 800 may be implemented as part of an on-demand transport service, such as described in FIGS. 2 and 3. In the context of FIG. 2, the computing system 200 may be implemented using a computer system 800 such as described by FIG. 8. The computing system 200 may also be implemented using a combination of multiple computer systems as described in connection with FIG. 8.

In one implementation, the computing system 800 includes processing resources 810, a main memory 820, a read-only memory (ROM) 830, a storage device 840, and a communication interface 850. The computing system 800 includes at least one processor 810 for processing information stored in the main memory 820, such as provided by a random-access memory (RAM) or other dynamic storage device, for storing information and instructions which are executable by the processor 810. The main memory 820 also may be used for storing temporary variables or other intermediate information during execution of instructions to be executed by the processor 810. The computing system 800 may also include the ROM 830 or other static storage device for storing static information and instructions for the processor 810. A storage device 840, such as a magnetic disk or optical disk, is provided for storing information and instructions.

The communication interface 850 enables the computing system 800 to communicate with one or more networks 880 (e.g., cellular network) through use of the network link (wireless or wired). Using the network link, the computing system 800 can communicate with one or more computing devices, one or more servers, one or more databases, and/or one or more self-driving vehicles. In accordance with examples, the computing system 800 receives transport requests from mobile computing devices of individual users. The executable instructions stored in the memory 830 can include matching instructions 824, which the processor 810 executes to receive HCV transport requests and match a requesting user with an HCV corridor, as described herein.

The executable instructions stored in the memory 820 can also include scheduling instructions 822 and gatekeeping instructions 826, which the processor 810 can execute to establish a supply flow schedule and/or start interval for each corridor using historical utilization data, and respond to real-time conditions (e.g., drivers coming online and demand conditions) to perform the gatekeeping operations described herein. The executable instructions can also include routing instructions 828, which the processor 810 can execute to determine weighted costs for dynamically routing HCVs through corridors.

Examples described herein relate to the use of the computing system 800 for implementing the techniques described herein. According to one example, those techniques are performed by the computing system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventors from claiming rights to such combinations.

What is claimed is:

1. A computing system comprising:
a network communication interface;
one or more processors;
a memory storing instructions that, when executed by the one or more processors, cause the computing system to:
compute a timing interval between high-capacity vehicles (HCVs) for each of a plurality of HCV corridors within a geographic region, each respective HCV corridor of the plurality of HCV corridors including a start area; and
for each respective HCV corridor, transmit, via the network communication interface, (i) first data to a first computing device associated with a first HCV, the first data indicating the start area of the respective HCV corridor, and a first start time for the first HCV, and (ii) second data to a second computing device associated with a second HCV, the second data indicating the start area of the respective HCV corridor and a second start time for the second HCV, wherein the first start time for the first HCV and the second start time for the second HCV are based on the computed timing interval for the respective HCV corridor.

2. The computing system of claim 1, wherein the executed instructions cause the computing system to compute the timing interval for the respective HCV corridor based on real-time service data for the geographic region, the real-time service data including a number of HCVs available to provide transport in the geographic region.

3. The computing system of claim 2, wherein the real-time service data further includes an estimated travel time from the start area of the respective HCV corridor to a corresponding end area of the respective HCV corridor.

4. The computing system of claim 3, wherein the real-time service data further includes an expected transport demand along the respective HCV corridor.

5. The computing system of claim 4, wherein the executed instructions cause the computing system to periodically recompute the timing interval for the respective HCV corridor based on the real-time service data.

6. The computing system of claim 1, wherein the executed instructions cause the computing system to compute the timing interval for the respective HCV corridor using a mathematical model that optimizes for one or more service objectives.

7. The computing system of claim 6, wherein the one or more service objectives correspond to a number of trips provided within the geographic region during a period of time.

8. The computing system of claim 6, wherein the one or more service objectives correspond to balancing, for the start area and a corresponding end area of the respective HCV corridor, a number of HCVs entering the start area and a number of HCVs exiting the corresponding end area of the respective HCV corridor.

9. The computing system of claim 1, wherein the computing system disables a particular HCV corridor of the plurality of HCV corridors in response to the timing interval for the particular HCV corridor exceeding a predetermined value.

10. A non-transitory computer-readable medium storing instructions that, when executed by one or more processors of a computing system, cause the computing system to:
 compute a timing interval between high-capacity vehicles (HCVs) for each of a plurality of HCV corridors within a geographic region, each respective HCV corridor of the plurality of HCV corridors including a start area; and
 for each respective HCV corridor, transmit, via a network communication interface, (i) first data to a first computing device associated with a first HCV, the first data indicating the start area of the respective HCV corridor, and a first start time for the first HCV, and (ii) second data to a second computing device associated with a second HCV, the second data indicating the start area of the respective HCV corridor and a second start time for the second HCV, wherein the first start time for the first HCV and the second start time for the second HCV are based on the computed timing interval for the respective HCV corridor.

11. The non-transitory computer-readable medium of claim 10, wherein the executed instructions cause the computing system to compute the timing interval for the respective HCV corridor based on real-time service data for the geographic region, the real-time service data including a number of HCVs available to provide transport in the geographic region.

12. The non-transitory computer-readable medium of claim 11, wherein the real-time service data further includes an estimated travel time from the start area of the respective HCV corridor to a corresponding end area of the respective HCV corridor.

13. The non-transitory computer-readable medium of claim 12, wherein the real-time service data further includes an expected transport demand along the respective HCV corridor.

14. The non-transitory computer-readable medium of claim 13, wherein the executed instructions cause the computing system to periodically recompute the timing interval for the respective HCV corridor based on the real-time service data.

15. The non-transitory computer-readable medium of claim 10, wherein the executed instructions cause the computing system to compute the timing interval for the respective HCV corridor using a mathematical model that optimizes for one or more service objectives.

16. The non-transitory computer-readable medium of claim 15, wherein the one or more service objectives correspond to a number of trips provided within the geographic region during a period of time.

17. The non-transitory computer-readable medium of claim 15, wherein the one or more service objectives correspond to balancing, for the start area and a corresponding end area of the respective HCV corridor, a number of HCVs entering the start area and a number of HCVs exiting the corresponding end area of the respective HCV corridor.

18. The non-transitory computer-readable medium of claim 10, wherein the computing system disables a particular HCV corridor of the plurality of HCV corridors in response to the timing interval for the particular HCV corridor exceeding a predetermined value.

19. A computer-implemented method of managing transport, the method being performed by one or more processors and comprising:
 computing a timing interval between high-capacity vehicles (HCVs) for each of a plurality of HCV corridors within a geographic region, each respective HCV corridor of the plurality of HCV corridors including a start area; and
 for each respective HCV corridor, transmitting, via a network communication interface, (i) first data to a first computing device associated with a first HCV, the first data indicating the start area of the respective HCV corridor, and a first start time for the first HCV, and (ii) second data to a second computing device associated with a second HCV, the second data indicating the start area of the respective HCV corridor and a second start time for the second HCV, wherein the first start time for the first HCV and the second start time for the second HCV are based on the computed timing interval for the respective HCV corridor.

20. The method of claim 19, wherein the one or more processors compute the timing interval for the respective HCV corridor based on real-time service data for the geographic region, the real-time service data including a number of HCVs available to provide transport in the geographic region.

* * * * *